(12) United States Patent
Liu et al.

(10) Patent No.: US 12,101,804 B2
(45) Date of Patent: Sep. 24, 2024

(54) METHOD AND APPARATUS FOR DATA TRANSMISSION AND COMPUTER READABLE MEDIUM

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 323 days.

(21) Appl. No.: 17/420,257

(22) PCT Filed: Dec. 17, 2019

(86) PCT No.: PCT/CN2019/125917
§ 371 (c)(1),
(2) Date: Jul. 1, 2021

(87) PCT Pub. No.: WO2020/143412
PCT Pub. Date: Jul. 16, 2020

(65) Prior Publication Data
US 2022/0150916 A1    May 12, 2022

(30) Foreign Application Priority Data
Jan. 10, 2019  (WO) ................ PCT/CN2019/071191

(51) Int. Cl.
*H04W 72/566* (2023.01)
*H04W 72/1268* (2023.01)
*H04W 72/23* (2023.01)

(52) U.S. Cl.
CPC ..... *H04W 72/569* (2023.01); *H04W 72/1268* (2013.01); *H04W 72/23* (2023.01)

(58) Field of Classification Search
None
See application file for complete search history.

(56) References Cited

U.S. PATENT DOCUMENTS

| 10,805,950 B2 | 10/2020 | Noh et al. |
| 2015/0071220 A1 | 3/2015 | Luo et al. |

(Continued)

FOREIGN PATENT DOCUMENTS

| CN | 107852746 A | 3/2018 |
| CN | 109155720 A | 1/2019 |
| WO | 2017164719 A1 | 9/2017 |

OTHER PUBLICATIONS

Indian Office Action dated Apr. 18, 2022 for Patent Application No. 202147035563, consisting of 6-pages.

(Continued)

*Primary Examiner* — Clemence S Han
(74) *Attorney, Agent, or Firm* — Weisberg I.P. Law, P.A.

(57) ABSTRACT

The present disclosure provides a UE and a method at a UE. The method includes: mapping an uplink grant with a logical channel, according to an LBT parameters associated with the uplink grant, the LBT parameters being related to at least one of a CAPC value, an LBT type, an LBT category, a channel sensing duration, a transmission time of an uplink data channel corresponding to the uplink grant and a random back-off time length; and performing the data transmission of the logical channel using the uplink grant. The present disclosure further provides a network node and a method at a network node, and corresponding computer readable storage media.

17 Claims, 7 Drawing Sheets

(56) References Cited

U.S. PATENT DOCUMENTS

| | | | | |
|---|---|---|---|---|
| 2017/0135128 | A1* | 5/2017 | Yerramalli | H04W 74/006 |
| 2017/0238342 | A1* | 8/2017 | Yang | H04W 74/04 |
| | | | | 370/329 |
| 2017/0353972 | A1 | 12/2017 | Babaei et al. | |
| 2018/0092043 | A1* | 3/2018 | Yerramalli | H04W 16/16 |
| 2018/0206260 | A1* | 7/2018 | Khoryaev | H04W 72/1263 |
| 2019/0104416 | A1* | 4/2019 | Yerramalli | H04W 72/20 |
| 2020/0100285 | A1* | 3/2020 | Roy | H04W 74/0808 |
| 2021/0112592 | A1* | 4/2021 | Lee | H04W 74/006 |
| 2022/0256639 | A1* | 8/2022 | Babaei | H04W 24/04 |

OTHER PUBLICATIONS

Author Unknown, "Technical Specification Group Radio Access Network; NR; Medium Access Control (MAC) protocol specification (Release 15)," Technical Specification 38.321, Version 15.2.0, 3GPP Organizational Partners, Jun. 2018, 73 pages.

International Search Report and Written Opinion for International Patent Application No. PCT/CN2019/125917, mailed Mar. 20, 2020, 10 pages.

EPO Communication with Supplementary European Search Report dated Jul. 26, 2022 for Patent Application No. 19908645.5, consisting of 9-pages.

3GPP TSG-RAN WG2 Meeting #103bis R2-1816723 Revision of R2-1813675; Title: CAPC for data transmission in NR-U; Agenda Item: 11.2.1.2; Source: MediaTek Inc.; Document for: Discussion and decision; Date and Location: Nov. 11-16, 2018, Spokane, USA, consisting of 3-pages.

3GPP TSG-RAN WG2 Meeting #104 R2-1816683 Revision of R2-1813966; Title: Multiple configured grants for NR-U; Agenda Item: 11.2.1.2; Source: MediaTek Inc.; Document for: Discussion and decision; Date and Location: Nov. 12-16, 2018, Spokane, US, consisting of 3-pages.

* cited by examiner

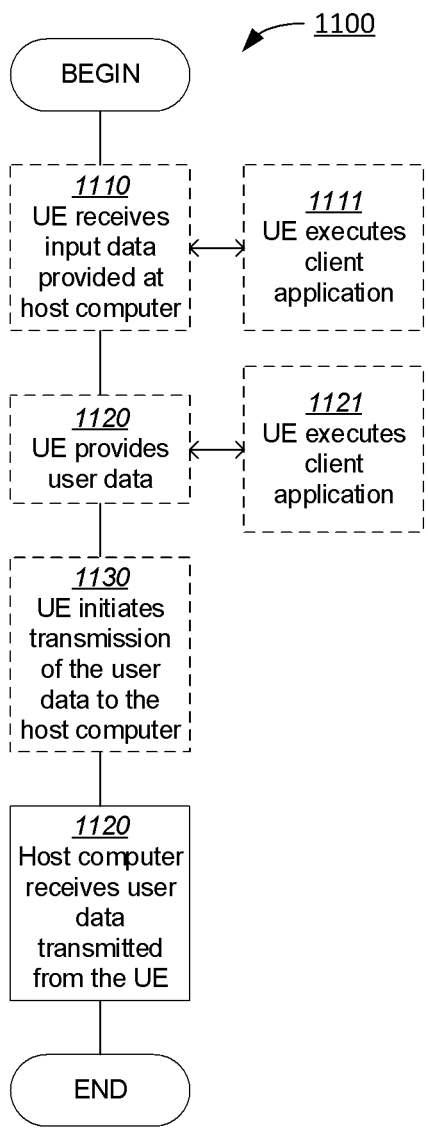
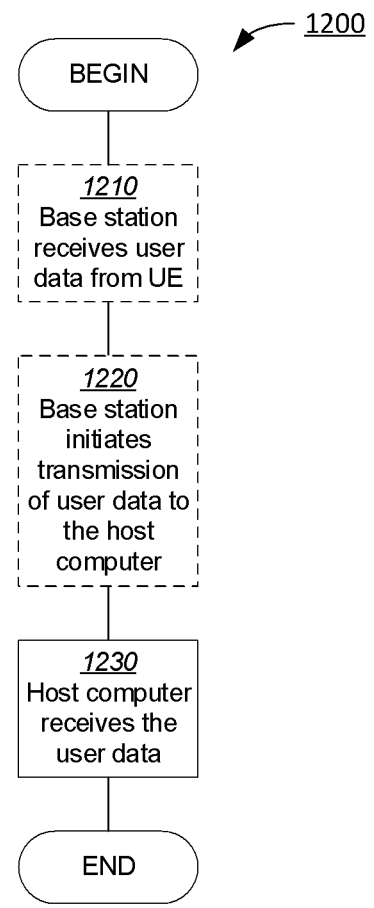
FIG. 11
FIG. 12

METHOD AND APPARATUS FOR DATA TRANSMISSION AND COMPUTER READABLE MEDIUM

This application is a 35 U.S.C. § 371 national phase filing of International Application No. PCT/CN2019/125917, filed Dec. 17, 2019, which claims the benefit of International Application No. PCT/CN2019/071191, filed Jan. 10, 2019, the disclosures of which are incorporated herein by reference in their entireties.

TECHNICAL FIELD

The present disclosure generally relates to the technical field of communications, and particularly to a method for data transmission of a logical channel based on an LBT parameter at a User Equipment (UE) and a corresponding UE, a method for configuring an LBT parameter at a network node and a corresponding network node, and a computer readable medium.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Unlicensed operation is one key part for New Radio (NR). At early phase, the unlicensed spectrum in 5 GHz is a focus in specification and system design. For the unlicensed operation, the NR system will be operated in the unlicensed spectrum which is shared by various wireless communication systems. Harmonious spectrum sharing scheme with acceptable complexity for both standardization and system design shall be preferred to ensure that different systems can coexist well. For different systems operated in the shared unlicensed spectrum (2.4 GHz and 5 GHz), the carrier sensing scheme is used. That is, before accessing a channel (or carrier) by a wireless communication system, the wireless communication system shall firstly determine if the channel is available via sensing the channel. If the channel is determined to be not available, the wireless communication system shall not access the channel. Carrier sensing is also interchangeably referred to as Listen-Before-Talk (LBT) herein. The LBT schemes for the WiFi system and the LTE system are briefly described below as reference. And LBT for UL data transmission of LTE is specially introduced as a reference for introducing the scheme in the present disclosure. Hereinafter, the relevant technology components are briefly described.

Channel Access Procedure in NR Unlicensed Spectrum

LBT is designed for unlicensed spectrum co-existence with other Radio Access Technologies (RATs). In this mechanism, a radio device applies a Clear Channel Assessment (CCA) check before any transmission. The transmitter involves Energy Detection (ED) over a time period compared to a certain threshold (e.g., an ED threshold) in order to determine if a channel is idle. In a case that the channel is determined to be occupied, the transmitter performs a random back-off within a contention window before next CCA attempt. In order to protect the ACK transmissions of a neighboring radio connection, the transmitter must defer a period after each busy CCA slot prior to resuming back-off. As soon as the transmitter has grasped access to a channel, the transmitter and its peer radio node are only allowed to perform transmission up to a maximum time duration (namely, a Maximum Channel Occupancy Time (MCOT)). For QoS differentiation, a channel access priority based on the service type has been defined. For example, there are four LBT priority classes defined for differentiation of Contention Window Sizes (CWS) and MCOT between services.

The channel access schemes for NR-based access for unlicensed spectrum can be classified into the following categories:

Category 1: Immediate transmission after a short UL/DL switching gap

This is used for a transmitter to immediately transmit after a UL/DL switching gap inside a COT.

The switching gap from reception to transmission is to accommodate the transceiver turnaround time and is no longer than 16 μs.

Category 2: LBT without random back-off

The duration of time that the channel is sensed to be idle before the transmitting entity transmits is deterministic.

Category 3: LBT with random back-off with a contention window of fixed size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with a contention window of variable size

The LBT procedure has the following procedure as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

Channel access mechanisms need to comply with regulations and may therefore need to be adapted for particular frequency ranges.

For the channel access mechanism, an LTE-License Assisted Access (LAA) LBT mechanism is adopted as baseline for 5 GHz band and adopted as the starting point of the design for 6 GHz band. At least for band where absence of Wi-Fi cannot be guaranteed (e.g. by regulation), LBT can be performed in bandwidth units of 20 MHz.

For 5 GHz band, having a 16 μs gap to accommodate for the transceiver turnaround before the immediate transmission of the responding node is beneficial for NR-Unlicensed (NR-U), such as for supporting fast A/N feedback, and is permitted per regulation. Restrictions/conditions on when this option can be used will be further identified, e.g., in consideration of fair coexistence.

A 16 μs gap to accommodate for the transceiver turnaround before the immediate transmission of the responding node can also be applied to 6 GHz band if allowed by regulation, and restrictions/conditions on when this option can be used will be further identified, if fair coexistence criterion is defined for 6 GHz band.

For the CWS adjustment procedure in NR-U, in addition to aspects considered in LTE LAA, NR-U may additionally consider at least the following aspects: Code Book Group (CBG)-based HARQ-ACK operation, NR scheduling and HARQ-feedback delays and processing times, wideband (>20 MHz) operation including BandWidth Parts (BWPs), Configured grant operation.

Channel Access Procedure and Data Multiplexing in LTE LAA

There are two types of uplink channel access procedures defined in LAA, i.e., Type 1 and Type 2. Type 1 is also referring to Category 4 channel access mechanism as in NR-U, while Type 2 is also referring to Category 2 channel access mechanism as in NR-U.

Which LBT type the UE applies is signaled via uplink grant for Physical Uplink Shared Channel (PUSCH) transmission on LAA SCells, except for Autonomous Uplink (AUL) transmission.

For Type 1 uplink channel access on AUL, E-UTRAN signals the Channel Access Priority Class (CAPC) for each logical channel and UE shall select the lowest CAPC (i.e., with a higher number in Table 1) of the logical channel(s) with the Media Access Control (MAC) Service Data Unit (SDU) multiplexed into the MAC Protocol Data Unit (PDU). The MAC Control Elements (CEs) except padding Buffer Status Report (BSR) use the highest CAPC (i.e., the lowest number in Table 1).

TABLE 1

Mapping between CAPCs and QCI

| CAPC (p) | QCI |
| --- | --- |
| 1 | 1, 3, 5, 65, 66, 69, 70 |
| 2 | 2, 7 |
| 3 | 4, 6, 8, 9 |
| 4 | — |

For Type 2 uplink channel access on AUL, the UE may select logical channels corresponding to any CAPC for UL transmission in the subframes signaled by E-UTRAN in common downlink control signaling.

For the uplink LAA operation, the network node (e.g., eNB) shall not schedule the UE more subframes than the minimum necessary to transmit all the traffic corresponding to the selected CAPC or lower (i.e., with a lower number in Table 1), than the:
- CAPC signaled in Uplink grant based on the latest BSR and received uplink traffic from the UE if Type 1 uplink channel access procedure is signaled to the UE;
- CAPC used by the network node based on the downlink traffic, the latest BSR and received UL traffic from the UE if Type 2 uplink channel access procedure is signaled to the UE.

Four CAPCs are defined which can be used when performing uplink and downlink transmissions in LAA carriers. Table 1 shows which CAPC should be used by traffic belonging to the different standardized QoS Class Identifiers (QCIs). A non-standardized QCI (i.e. Operator specific QCI) should use suitable CAPC based on the below table, i.e. the CAPC used for a non-standardized QCI should be the CAPC of the standardized QCIs which best matches the traffic class of the non-standardized QCI.

For uplink, the network node selects the CAPC by taking into account the lowest priority QCI in a Logical Channel Group.

Multiplexing of Data in LTE LAA

If a DL transmission burst with PDSCH is transmitted, for which channel access has been obtained using CAPC P (1 . . . 4), E-UTRAN shall ensure the following where a DL transmission burst refers to the continuous transmission by E-UTRAN after a successful LBT:
- the transmission duration of the DL transmission burst shall not exceed the minimum duration needed to transmit all available buffered traffic corresponding to CAPC(s)≤P,
- the transmission duration of the DL transmission burst shall not exceed the Maximum Channel Occupancy Time (MCOT) for CAPC P;
- additional traffic corresponding to CAPC(s)>P may only be included in the DL transmission burst once no more data corresponding to CAPC≤P is available for transmission. In such cases, E-UTRAN should maximize occupancy of the remaining transmission resources in the DL transmission burst with this additional traffic.

For PUSCH transmission, there is no additional restriction at the UE (other than the multiplexing rules in the LCP procedure) on the type of the traffic that can be carried in the scheduled subframes.

Logical Channel Priority (LCP) in NR

Upon construction of a MAC PDU, the MAC entity shall include the data in the MAC PDU according to the preconfigured/predefined logical channel priority order. The corresponding description is described in Section 5.4.3 of 3GPP TS 38.321-f20 (which is incorporated herein by reference):

Logical channels shall be prioritized in accordance with the following order (highest priority listed first):
- Cell-Radio Network Temporary Identifier (C-RNTI) Media Access Control (MAC) Control Element (CE) or data from UL-Common Control Channel (CCCH);
- Configured Grant Confirmation MAC CE;
- MAC CE for BSR, with exception of BSR included for padding;
- Single Entry Power Headroom Report (PHR) MAC CE or Multiple Entry PHR MAC CE;
- data from any Logical Channel, except data from UL-CCCH;
- MAC CE for Recommended bit rate query;
- MAC CE for BSR included for padding.

In LTE LAA, the correspondence between CAPC and QoS Class Identifier (QCI) has been specified in Specification, based on which the LBT type is determined for a UE by its serving network node. Which LBT type the UE applies is signaled via uplink grant for PUSCH transmission on LAA SCells, except for AUL transmission. For Type 1 uplink channel access on AUL, E-UTRAN signals the Channel Access Priority Class for each logical channel and UE shall select the lowest Channel Access Priority Class (i.e., with a higher number in Table 1) of the logical channel(s) with MAC SDU multiplexed into the MAC PDU. The MAC CEs except padding BSR use the highest Channel Access Priority Class (i.e., the lowest number). For Type 2 uplink channel access on AUL, the UE may select logical channels corresponding to any Channel Access Priority Class for UL transmission in the subframes signaled by E-UTRAN in common downlink control signaling.

For PUSCH transmission, there is no additional restriction at the UE (other than the multiplexing rules in the LCP procedure) on the type of the traffic that can be carried in the scheduled subframes.

Based on the above description, in most of cases except AUL/configured scheduling, it is a network node (e.g., eNB or gNB) that determines the LBT type for a UE for any uplink data transmission, and signals UEs of the LBT type via a Downlink Control Indicator (DCI) signaling. For AUL/configured scheduling, it is the UE that selects the LBT type. At the same time, there is no additional restriction on the LCP restriction regarding the LBT type or CAPC. This is not sufficient in NR-U regarding data multiplexing/LCP procedure with respect to CAPC. Especially for Category 4 channel access mechanism, each CAPC is associated with different settings on MCOT durations and congestion window durations. This means that the UE would experience different latency for LBT operations with different CAPC. According to the existing LCP procedure, the existing mapping restrictions are performed considering the transmission properties based on a set of parameters, such as allowedSCS-List, maxPUSCH-Duration, configuredGrantType1Allowed, and allowedServingCells. According to such a procedure, a UE may map a delay insensitive service to transmit using an uplink grant associated with a higher CAPC (i.e., a lower number) since that uplink grant is expected to deliver the data from the delay-sensitive service; and also a UE may map higher priority service data to an uplink grant indicating a larger CAPC (i.e. a lower priority to access channel). These are not desired cases.

Therefore, it is necessary to achieve potential enhancements to the LCP procedure considering additional restriction imposed by the LBT type and CAPC associated with the uplink grant.

SUMMARY

The present disclosure proposes to consider an LBT parameter (e.g., an LBT parameters related to at least one of a CAPC value, an LBT type, an LBT category, a channel sensing duration, a transmission time of an uplink data channel corresponding to the uplink grant and a random back-off time length etc.) associated with a received uplink grant during the LCP procedure at the MAC layer, so that the data transmission of the logical channel with delay sensitive requirements may be performed using the uplink grant whose associated LBT parameter(s) meets an LCP restriction of the logical channel, i.e., meets a higher priority to access the logical channel. In this way, the QoS requirements of the logical channel may be better satisfied.

According to a first aspect of the present disclosure, a method at a UE is provided. The method includes: mapping an uplink grant with a logical channel, according to an LBT parameter associated with the uplink grant, the LBT parameter being related to at least one of a CAPC value, an LBT type, an LBT category, a channel sensing duration, a transmission time of an uplink data channel corresponding to the uplink grant and a random back-off time length; and performing the data transmission of the logical channel using the uplink grant.

In an exemplary embodiment, the uplink grant is mapped with the logical channel if the at least one of the LBT parameters associated with the uplink grant meets an LCP restriction of the logical channel.

In an exemplary embodiment, the LBT parameter is related to the CAPC value and the LCP restriction includes an allowed CAPC value range for the data transmission of the logical channel, and said mapping the uplink grant includes: mapping an uplink grant whose associated CAPC value is within the allowed CAPC value range with the logical channel.

In an exemplary embodiment, the LBT parameter is related to the channel sensing duration, and
the LCP restriction includes a first parameter indicating a channel sensing duration threshold, and said mapping the uplink grant includes: mapping an uplink grant whose channel sensing duration is shorter than the channel sensing duration threshold indicated by the first parameter with the logical channel; and/or
the LCP restriction includes a second parameter indicating that a shortest channel sensing duration is prioritized, and said mapping the uplink grant includes: mapping an uplink grant with the shortest channel sensing duration for data transmission of a prioritized logical channel with the logical channel.

In an exemplary embodiment, the LBT parameter is related to the transmission time of the uplink data channel corresponding to the uplink grant, and
the LCP restriction includes a third parameter indicating a transmission time threshold of the transmission time of the uplink data channel corresponding to the uplink grant, and said mapping the uplink grant includes: mapping an uplink grant whose corresponding transmission time of the uplink data channel is earlier than the transmission time threshold indicated by the third parameter with the logical channel; and/or
the LCP restriction includes a fourth parameter indicating that an earliest transmission time of the uplink data channel corresponding to the uplink grant is prioritized, and said mapping the uplink grant includes: mapping an uplink grant with the earliest corresponding transmission time of the uplink data channel for data transmission of a prioritized logical channel based on the fourth parameter with the logical channel.

In an exemplary embodiment, the LBT parameter is related to the random back-off time length, and
the LCP restriction includes a fifth parameter indicating a random back-off threshold of the random back-off time length, and said mapping the uplink grant includes: mapping an uplink grant whose random back-off time length is shorter than the random back-off threshold indicated by the fifth parameter with the logical channel; and/or
the LCP restriction includes a sixth parameter indicating that a shortest random back-off time length is prioritized, and said mapping the uplink grant includes: mapping an uplink grant with the shortest random back-off time length for data transmission of a prioritized logical channel based on the sixth parameter with the logical channel.

In an exemplary embodiment, in a case that there are a plurality of uplink grants whose corresponding LBT parameters are different, a priority order for the plurality of uplink grants is preconfigured according to the corresponding LBT parameters.

In an exemplary embodiment, the LCP restriction includes the priority order, and said mapping the uplink grant includes: mapping an uplink grant which is prioritized according to the preconfigured priority order for data transmission of the logical channel from the plurality of uplink grants with the logical channel.

In an exemplary embodiment, the LBT parameter is related to the LBT type and/or LBT category, the LCP restriction includes a seventh parameter indicating a list of allowed LBT types or LBT categories for an uplink grant to be used, and said mapping the uplink grant includes: mapping an uplink grant whose associated LBT type or LBT category is within the list indicated by the seventh parameter with the logical channel.

In an exemplary embodiment, the LCP restriction is configured by a network node.

In an exemplary embodiment, an LCP value of a logical channel is used for indicating the LCP restriction of the logical channel, and has a correspondence with an LBT parameter, and wherein the uplink grant is mapped with the logical channel according to the LCP value of the logical channel.

In an exemplary embodiment, the UE is configured with the LCP restriction by at least one of:
dedicated Radio Resource Control (RRC) signaling,
common RRC signaling,
MAC CE,
an implicit or explicit indicator using a downlink control channel.

According to a second aspect of the present disclosure, a UE is provided. The UE includes: at least one processor, and at least one memory, storing instructions which, when executed on the at least one processor, cause the at least one processor to perform the method according to the first aspect of the present disclosure.

According to third aspect of the present disclosure, a computer readable storage medium having computer program instructions stored thereon, the computer program instructions, when executed by at least one processor in a UE, causing the at least one processor to perform the method according to the first aspect of the present disclosure.

According to fourth aspect of the present disclosure, a method at a network node is provided. The method includes: configuring an LCP restriction of a logical channel and an LBT parameter associated with an uplink grant, the LBT parameter being related to at least one of a CAPC value, an LBT type, an LBT category, a channel sensing duration, a transmission time of an uplink data channel corresponding to the uplink grant and a random back-off time length; and transmitting the configured LCP restriction and LBT parameter to a UE.

In an exemplary embodiment, the LCP restriction and the LBT parameter are configured per logical channel or per MAC entity.

In an exemplary embodiment, the LBT parameter is related to the CAPC value and the LCP restriction is configured to include an allowed CAPC value range for the data transmission of the logical channel.

In an exemplary embodiment, the LBT parameter is related to the channel sensing duration, and
the LCP restriction is configured to include a first parameter indicating a channel sensing duration threshold and/or a second parameter indicating that a shortest channel sensing duration is prioritized.

In an exemplary embodiment, the LBT parameter is related to the transmission time of the uplink data channel corresponding to the uplink grant, and
the LCP restriction is configured to include a third parameter indicating a transmission time threshold of the transmission time of the uplink data channel corresponding to the uplink grant and/or a fourth parameter indicating that an earliest transmission time of the uplink data channel corresponding to the uplink grant is prioritized.

In an exemplary embodiment, the LBT parameter is related to the random back-off time length, and
the LCP restriction is configured to include a fifth parameter indicating a random back-off threshold of the random back-off time length and/or a sixth parameter indicating that a shortest random back-off time length is prioritized.

In an exemplary embodiment, the method further includes: in a case that a plurality of uplink grants whose corresponding LBT parameters are different are configured for the UE, preconfiguring a priority order for the plurality of uplink grants according to the corresponding LBT parameters, and wherein the LCP restriction is configured to include the priority order.

In an exemplary embodiment, the LBT parameter is related to the LBT type and/or LBT category, the LCP restriction is configured to include a seventh parameter indicating a list of allowed LBT types or LBT categories for an uplink grant to be used.

In an exemplary embodiment, an LCP value of a logical channel is used for indicating the LCP restriction of the logical channel, and has a correspondence with an LBT parameter, and wherein the uplink grant is mapped with the logical channel according to the LCP value of the logical channel.

In an exemplary embodiment, the LCP restriction is transmitted to the UE by at least one of:
dedicated RRC signaling,
common RRC signaling,
MAC CE,
an implicit or explicit indicator using a downlink control channel.

According to fifth aspect of the present disclosure, a network node is provided. The network node includes at least one processor, and at least one memory, storing instructions which, when executed on the at least one processor, cause the at least one processor to perform the method according to the fourth aspect of the present disclosure.

According to sixth aspect of the present disclosure, a computer readable storage medium having computer program instructions stored thereon, the computer program instructions, when executed by at least one processor in a network node, causing the at least one processor to perform the method according to the fourth aspect of the present disclosure.

According to a seventh aspect of the present disclosure, a communication system is provided. The communication system includes a host computer including: processing circuitry configured to provide user data; and a communication interface configured to forward the user data to a cellular network for transmission to a UE. The cellular network includes a base station, a transmission point, relay node, an IAB node or an UE having a radio interface and processing circuitry. The base station's processing circuitry is configured to perform the method according to the first or fourth aspect of the present disclosure.

In an exemplary embodiment, the communication system can further include the base station.

In an exemplary embodiment, the communication system can further include the UE. The UE is configured to communicate with the base station.

In an exemplary embodiment, the processing circuitry of the host computer can be configured to execute a host application, thereby providing the user data. The UE can include processing circuitry configured to execute a client application associated with the host application.

According to an eighth aspect of the present disclosure, a method is provided. The method is implemented in a communication system including a host computer, a base station and a UE. The method includes: at the host computer, providing user data; and at the host computer, initiating a transmission carrying the user data to the UE via a cellular network including the base station. The base station can perform the method according to the first aspect of the present disclosure.

In an exemplary embodiment, the method further can include: at the base station, transmitting the user data.

In an exemplary embodiment, the user data can be provided at the host computer by executing a host application. The method can further include: at the UE, executing a client application associated with the host application.

According to a ninth aspect of the present disclosure, a communication system is provided. The communication system includes a host computer including: processing circuitry configured to provide user data; and a communication interface configured to forward user data to a cellular network for transmission to a UE. The UE includes a radio interface and processing circuitry. The UE's processing circuitry is configured to perform the method according to the first aspect of the present disclosure.

In an exemplary embodiment, the communication system can further include the UE.

In an exemplary embodiment, the cellular network can further include a base station configured to communicate with the UE.

In an exemplary embodiment, the processing circuitry of the host computer can be configured to execute a host application, thereby providing the user data. The UE's processing circuitry can be configured to execute a client application associated with the host application.

According to a tenth aspect of the present disclosure, a method is provided. The method is implemented in a communication system including a host computer, a base station and a UE. The method includes: at the host computer, providing user data; and at the host computer, initiating a transmission carrying the user data to the UE via a cellular network including the base station. The UE can perform the method according to the fourth aspect of the present disclosure.

In an exemplary embodiment, the method can further include: at the UE, receiving the user data from the base station.

According to an eleventh aspect of the present disclosure, a communication system is provided. The communication system includes a host computer including: a communication interface configured to receive user data originating from a transmission from a UE to a base station. The UE includes a radio interface and processing circuitry. The UE's processing circuitry is configured to: perform the method according to the first aspect of the present disclosure.

In an exemplary embodiment, the communication system can further include the UE.

In an exemplary embodiment, the communication system can further include the base station. The base station can include a radio interface configured to communicate with the UE and a communication interface configured to forward to the host computer the user data carried by a transmission from the UE to the base station.

In an exemplary embodiment, the processing circuitry of the host computer can be configured to execute a host application. The UE's processing circuitry can be configured to execute a client application associated with the host application, thereby providing the user data.

In an exemplary embodiment, the processing circuitry of the host computer can be configured to execute a host application, thereby providing request data. The UE's processing circuitry can be configured to execute a client application associated with the host application, thereby providing the user data in response to the request data.

According to a twelfth aspect of the present disclosure, a method is provided. The method is implemented in a communication system including a host computer, a base station and a UE. The method includes: at the host computer, receiving user data transmitted to the base station from the UE. The UE can perform the method according to the first aspect of the present disclosure.

In an exemplary embodiment, the method can further include: at the UE, providing the user data to the base station.

In an exemplary embodiment, the method can further include: at the UE, executing a client application, thereby providing the user data to be transmitted; and at the host computer, executing a host application associated with the client application.

In an exemplary embodiment, the method can further include: at the UE, executing a client application; and at the UE, receiving input data to the client application, the input data being provided at the host computer by executing a host application associated with the client application. The user data to be transmitted is provided by the client application in response to the input data.

According to a thirteenth aspect of the present disclosure, a communication system is provided. The communication system includes a host computer including a communication interface configured to receive user data originating from a transmission from a UE to a base station. The base station includes a radio interface and processing circuitry. The base station's processing circuitry is configured to perform the method according to the first or fourth aspect of the present disclosure.

In an exemplary embodiment, the communication system can further include the base station.

In an exemplary embodiment, the communication system can further include the UE. The UE can be configured to communicate with the base station.

In an exemplary embodiment, the processing circuitry of the host computer can be configured to execute a host application; the UE can be configured to execute a client application associated with the host application, thereby providing the user data to be received by the host computer.

According to a fourteenth aspect of the present disclosure, a method is provided. The method is implemented in a communication system including a host computer, a base station and a UE. The method includes: at the host computer, receiving, from the base station, user data originating from a transmission which the base station has received from the UE. The base station can perform the method according to the first or fourth aspect of the present disclosure.

In an exemplary embodiment, the method can further include: at the base station, receiving the user data from the UE.

In an exemplary embodiment, the method can further include: at the base station, initiating a transmission of the received user data to the host computer.

The technical solutions according to the embodiments of the present disclosure may achieve at least benefits as follows:

reducing the transmission delay of the high priority data information and/or MAC CE;

enhancing the transmission reliability of the high priority data information and/or MAC CE;

enhancing the capability to serve low latency (e.g., Ultra Reliable Low Latency Communications (URLLC)) traffic using the unlicensed spectrum.

BRIEF DESCRIPTION OF THE DRAWINGS

The objects, advantages and characteristics of the present disclosure will be more apparent, according to descriptions of preferred embodiments in connection with the drawings, in which:

FIGS. 9 to 12 are flowcharts illustrating methods implemented in a communication system including a host computer, a base station and a UE.

Figure 1:
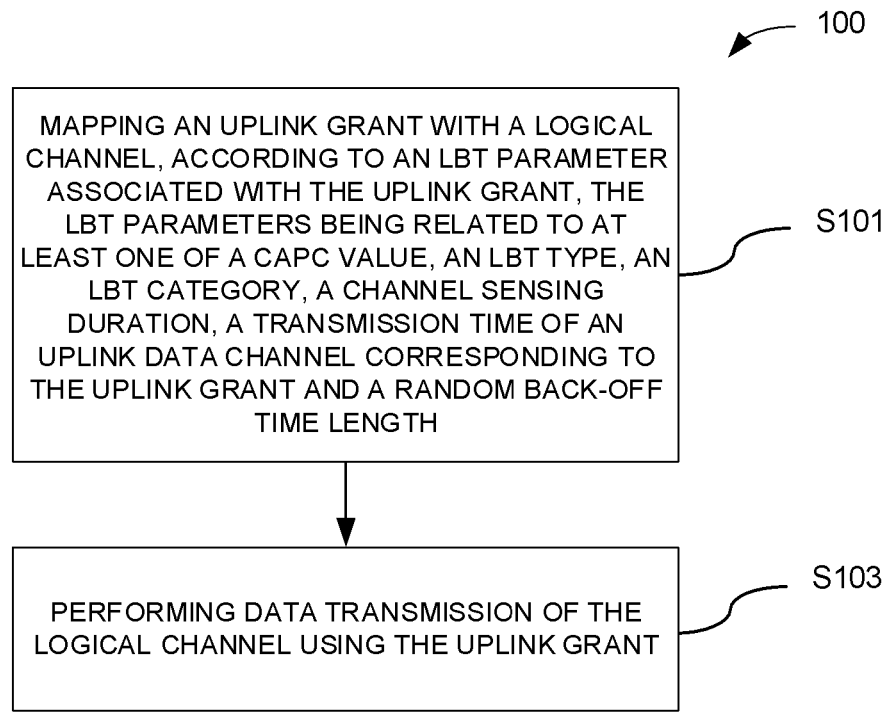
FIG. 1 schematically shows a flowchart illustrating a method at a UE for data transmission of a logical channel based on an LBT parameter according to an exemplary embodiment of the present disclosure.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The techniques described herein may be used for various wireless communication networks such as CDMA, TDMA, FDMA, OFDMA, SC-FDMA, LTE and other networks developed in the future. The terms "network" and "system" are often used interchangeably. For illustration only, certain aspects of the techniques are described below for the next, i.e. the 5th generation of wireless communication network, such as NR. However, it will be appreciated by the skilled in the art that the techniques described herein may also be used for other wireless networks such as LTE and corresponding radio technologies mentioned herein as well as wireless networks and radio technologies proposed in the future.

As used herein, the term "network node" refers to a device in a wireless communication network via which a terminal device or another network node accesses the network and receives services therefrom. The network node refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE (user equipment), or other suitable devices. The UE may be, for example, a SS (Subscriber Station), a Portable Subscriber Station, a MS (Mobile Station), or an AT (Access Terminal), a relay node. The terminal device may include, but not limited to, portable computers, image capture terminal devices such as digital cameras, gaming terminal devices, music storage and playback appliances, a mobile phone, a cellular phone, a smart phone, VoIP (voice over IP) phones, wireless local loop phones, a tablet, a wearable device, a PDA (personal digital assistant), portable computers, desktop computer, image capture terminal devices such as digital cameras, gaming terminal devices, music storage and playback appliances, wearable terminal devices, vehicle-mounted wireless terminal devices, wireless endpoints, mobile stations, LEE (laptop-embedded equipment), LME (laptop-mounted equipment), USB dongles, smart devices, wireless CPE (customer-premises equipment) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an IOT (Internet of Things) scenario, a terminal device may represent a machine or other device that performs monitoring and/or measurements, and transmits the results of such monitoring and/or measurements to another terminal device and/or network equipment. The terminal device may in this case be a M2M (machine-to-machine) device, which may in a 3GPP context be referred to as a MTC device. As one particular example, the terminal device may be a UE implementing the 3GPP NB-IoT standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network node to a terminal device, and an uplink, UL transmission refers to a transmission in an opposite direction.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

It will be appreciated that although the embodiments of the present disclosure are exemplified hereinafter to be applied to the unlicensed spectrum scenarios in the context of NR-U, describing enhancing the LCP procedure considering the additional restriction imposed by at least one of LBT parameters, such as a CAPC value, an LBT type, an LBT category, a channel sensing duration, and a random back-off, which is associated with the uplink grant, the basic idea of the present disclosure is also applicable to other unlicensed spectrum scenarios such as LTE LAA/enhanced LAA (eLAA)/further enhancement of LAA (feLAA) etc.

Hereinafter, a method at a UE for data transmission of a logical channel based on LCP according to an exemplary embodiment of the present disclosure will be described with reference to FIG. 1.

FIG. 1 is a flowchart illustrating a method at a UE for data transmission of a logical channel based on a LBT parameter according to an exemplary embodiment of the present disclosure.

As shown in FIG. 1, the method 100 for data transmission of a logical channel based on a LBT parameter includes steps S101 and S103.

In step S101, the UE (particularly, the MAC layer thereof) maps an uplink grant with a logical channel, according to an LBT parameter associated with an uplink grant. In particular, the LBT parameter may be related to at least one of a CAPC value, an LBT type, an LBT category, a channel sensing duration, a transmission time of an uplink data channel corresponding to the uplink grant and a random back-off time length.

In step S103, the UE may perform the data transmission of the logical channel using the uplink grant.

As such, in addition to the existing mapping restrictions (also referred to as LCP restrictions), such as allowedSCS-List, maxPUSCH-Duration, configuredGrantType1Allowed and allowedServingCells, the LBT parameter related to at least one of the CAPC value, the LBT type, the LBT category, the channel sensing duration, the transmission time of the uplink data channel corresponding to the uplink grant and the random back-off time length may also be considered in the LCP procedure, so that a logical channel may be mapped to an uplink grant whose associated LBT parameter(s) meets the LCP restriction of the logical channel. For example, a logical channel which requires a lower latency transmission may be mapped to an uplink grant which corresponds to a shorter channel sensing duration and/or an earlier transmission time of the corresponding uplink data channel. In this case, the uplink grant may be mapped with the logical channel.

The LCP procedure may be controlled by the network node configuring mapping restrictions (i.e., LCP restrictions) for each logical channel.

Specifically, the UE (particularly, the MAC entity thereof) may map an uplink grant with a logical channel, if the uplink grant meets at least one of the existing LCP restrictions, such as that a set of allowed Subcarrier Spacing index values in allowedSCS-List, if configured, includes the Subcarrier Spacing index associated to the uplink grant, maxPUSCH-Duration, if configured, is larger than or equal to the PUSCH transmission duration associated to the uplink grant, configuredGrantType1Allowed, if configured, is set to TRUE in case the uplink grant is a Configured Grant Type 1, allowedServingCells, if configured, includes the Cell information associated to the Uplink grant.

Besides the existing mapping restrictions as discussed previously, additional LCP restrictions may be introduced in the LCP procedure.

In an exemplary embodiment, the LBT parameter may be related to the CAPC value, and the additional LCP restriction may include an allowed CAPC value range for the data transmission of the logical channel. As such, an uplink grant whose associated CAPC value is within the allowed CAPC value range may be mapped with the logical channel.

For example, the additional LCP restriction may be denoted as allowedMaxCAPC, which indicates the allowed CAPC value range for the data transmission of the logical channel. In this example, allowedMaxCAPC, if configured, is larger than or equal to the CAPC value associated with the UL grant. For each logical channel and/or MAC CE, the LCP restriction allowedMaxCAPC may be configured in such a way that the logical channels and/or MAC CEs fitting to the CAPC value associated with received uplink grant are allowed to transmit using the received uplink grant. The allowedMaxCAPC may be configured for each logical channel by e.g. RRC that mainly considers if the QoS requirement of a logical channel, such as UP latency requirement, is met using an uplink grant which is given a configured CAPC value (since it may lead to different latency ranges for potential LBT operations). The allowed CAPC value range is not limited to the maximum value of allowed CAPC value, and can be for example represented by a minimum value of allowed CAPC value, or both of maximum value and minimum value.

Alternatively or additionally, in an exemplary embodiment, when there are multiple uplink grants available (regardless of the associated CAPC values being the same or different, the associated LBT types being the same or different, the associated LBT categories being the same or different) and a respective channel sensing duration is generated for each uplink grant, the data of a logical channel which requires a lower latency transmission may be mapped to the uplink grant which has a shorter channel sensing duration.

In an implementation of the exemplary embodiment, the LBT parameter may be related to the channel sensing duration. In this implementation, the additional LCP restriction may include a first parameter indicating a channel sensing duration threshold, and an uplink grant whose channel sensing duration is shorter than the channel sensing duration threshold indicated by the first parameter may be mapped with the logical channel. For example, the first parameter may be denoted as IbtDurationThreshold. Only if the channel sensing duration of an uplink grant is shorter than IbtDurationThreshold for a logical channel, this uplink grant may be used for the data transmission of the logical channel. The UE may determine the channel sensing time upon reception of the uplink grant. Alternatively or additionally, the additional LCP restriction may include a second parameter indicating that a shortest channel sensing duration is prioritized, and an uplink grant with the shortest channel sensing duration for data transmission of a prioritized logical channel may be mapped with the prioritized logical channel. For example, the second parameter may be denoted as isShortLbtPrioritized. If isShortLbtPrioritized is configured, the UE may map, with the prioritized logical channel, the uplink grant with the shortest channel sensing duration first for the data transmission of the prioritized logical channel.

Alternatively or additionally, in another implementation, the LBT parameter may be related to the transmission time of the uplink data channel corresponding to the uplink grant. In this implementation, the additional LCP restriction may include a third parameter indicating a transmission time threshold of the transmission time of the uplink data channel corresponding to the uplink grant, and an uplink grant whose corresponding transmission time of the uplink data channel is earlier than the transmission time threshold indicated by the third parameter may be mapped with the logical channel. Alternatively or additionally, the additional LCP restriction may include a fourth parameter indicating that an earliest transmission time of the uplink data channel corresponding to the uplink grant is prioritized, and an uplink grant with the earliest corresponding transmission time of the uplink data channel for data transmission of a prioritized logical channel based on the fourth parameter may be mapped with the prioritized logical channel.

Alternatively or additionally, in yet another implementation, the LBT parameter may be related to the random back-off time length. In this implementation, the additional LCP restriction may include a fifth parameter indicating a random back-off threshold of the random back-off time length, and an uplink grant whose random back-off time length is shorter than the random back-off threshold indicated by the fifth parameter may be mapped with the logical channel. Alternatively or additionally, the additional LCP restriction may include a sixth parameter indicating that a shortest random back-off time length is prioritized, and an uplink grant with the shortest random back-off time length for data transmission of a prioritized logical channel based on the sixth parameter may be mapped with the prioritized logical channel.

Alternatively or additionally, in an exemplary embodiment, there are a plurality of uplink grants whose corresponding LBT parameters are different (i.e., the LBT parameters related to the CAPC value being different, and/or the LBT parameters related to the LBT type being different, and/or the LBT parameters related to the LBT category being different, and/or the LBT parameters related to the channel sensing duration being different, and/or the LBT parameters related to the transmission time of the uplink data channel corresponding to the uplink grant being different, and/or the LBT parameters related to the random back-off time length being different), a priority order for the plurality of uplink grants may be preconfigured according to the corresponding LBT parameters, such as the LBT parameters related to the CAPC value, and/or the LBT parameters related to the LBT type, and/or the LBT parameters related to the LBT category, and/or the LBT parameters related to the channel sensing duration, and/or the LBT parameters related to the transmission time of the uplink data channel corresponding to the uplink grant, and/or the LBT parameters related to the random back-off time length.

In an implementation, the additional LCP restriction may include the preconfigured priority order, and an uplink grant which is prioritized according to the preconfigured priority order may be mapped with a logical channel from the plurality of uplink grants. For example, the UE may map the prioritized uplink grant with the prioritized logical channel.

Alternatively or additionally, in another implementation, the LBT parameter may be related to the LBT type and/or LBT category. In this case, the additional LCP restriction may include a seventh parameter indicating a list of allowed LBT types or LBT categories for an uplink grant to be used, and an uplink grant whose associated LBT type or LBT category is within the list indicated by the seventh parameter may be mapped with a logical channel from the plurality of uplink grants. For example, the seventh parameter may be denoted as allowedLbtSchemeList for restricting the LBT type or LBT category for a logical channel. The uplink grant may be mapped with the logical channel if the associated LBT scheme, i.e., the LBT type or LBT category, is within the list indicated by allowedLbtSchemeList.

In an exemplary embodiment, the additional LCP restrictions as previously discussed may be configured by the network node. It should be understood that the additional LCP restrictions as previously discussed may be applied separately or in any combination thereof.

In an exemplary embodiment, there is no additional LCP restriction concerning at least one of the CAPC value, the LBT type, the LBT category, the channel sensing duration, the transmission time of an uplink data channel corresponding to the uplink grant and the random back-off time length being introduced in the LCP procedure. Instead, the LCP restriction concerning the at least one of the CAPC value, the LBT type, the LBT category, the channel sensing duration, the transmission time of an uplink data channel corresponding to the uplink grant and the random back-off time length is performed relying on the existing mapping restriction conditions such as the LCP. In this embodiment, an LCP value of a logical channel may be used for indicating the LCP restriction of the logical channel. The LCP value may have a correspondence with the LBT parameter related to at least one of the CAPC value, the LBT type, the LBT category, the channel sensing duration, the transmission time of an uplink data channel corresponding to the uplink grant and the random back-off time length. In this case, the uplink grant may be mapped with the logical channel according to the LCP value of the logical channel.

For example, upon reception of every uplink grant/DCI signaling carrying a CAPC value, the MAC entity would find the LCP values associated with this CAPC value. This may be performed based on e.g. a table which has a correspondence between LCP values and CAPC values. After that, the MAC entity performs the ordinary LCP procedure with these LCP values as input. The MAC entity would then select logical channels by performing the ordinary LCP procedure (further checking other mapping restrictions) among the set of logical channels associated to the LCP values output from the table. Alternatively, the DCI signaling may also carry the intended LCP values by itself.

In an exemplary embodiment, the additional LCP restrictions may be transmitted to the UE by at least one of:
dedicated RRC signaling,
common RRC signaling,
MAC CE,
an implicit or explicit indicator using a downlink control channel, wherein the implicit indicator refers to the above embodiment in which there is a correspondence between an LCP value of a logical channel and an LBT parameter as previously described.

Figure 2:
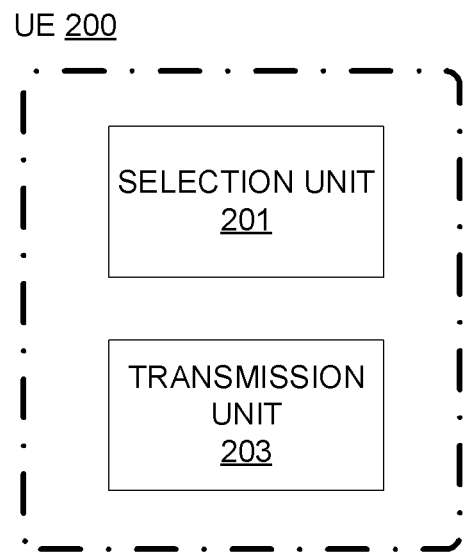
FIG. 2 is a block diagram of a UE according to an exemplary embodiment of the present disclosure.

Hereinafter, a structure of a UE according to an exemplary embodiment of the present disclosure will be described with reference to FIG. 2. FIG. 2 shows a block diagram of a UE 200 according to an exemplary embodiment of the present disclosure. The UE 200 in FIG. 2 may perform the method 100 for data transmission of a logical channel based on LCP as described previously with reference to FIG. 1. Accordingly, some detailed description on the UE 200 may refer to the corresponding description of the method 100 for data transmission of a logical channel based on LCP as previously discussed, and thus will be omitted here for simplicity.

As shown in FIG. 2, the UE 200 may include a selection unit 201 and a transmission unit 203.

The selection unit 201 may be configured to map an uplink grant with a logical channel, according to an LBT parameter associated with the uplink grant, the LBT parameter being related to at least one of a CAPC value, an LBT type, an LBT category, a channel sensing duration, a transmission time of an uplink data channel corresponding to the uplink grant and a random back-off time length.

The transmission unit 203 may be configured to perform the data transmission of the logical channel using the uplink grant.

In an exemplary embodiment, the selection unit 201 may map the uplink grant with the logical channel if the LBT parameter associated with the uplink grant meets an LCP restriction of the logical channel.

In an exemplary embodiment, the LBT parameter may be related to the CAPC value, and the LCP restriction may include an allowed CAPC value range for the data transmission of the logical channel. In this embodiment, the selection unit 201 may map, with the logical channel, the uplink grant whose associated CAPC value is within the allowed CAPC value range for the data transmission of the logical channel.

Alternatively or additionally, the LBT parameter may be related to the channel sensing duration. In this embodiment, the LCP restriction may include a first parameter indicating a channel sensing duration threshold, and the selection unit 201 may map, with a logical channel, an uplink grant whose channel sensing duration is shorter than the channel sensing duration threshold indicated by the first parameter for the data transmission of the logical channel. Alternatively or additionally, the LCP restriction may include a second parameter indicating that a shortest channel sensing duration is prioritized, and the selection unit 201 may map, with a prioritized logical channel, an uplink grant with the shortest channel sensing duration for data transmission of a prioritized logical channel.

Alternatively or additionally, the LBT parameter may be related to the transmission time of the uplink data channel corresponding to the uplink grant. In this embodiment, the LCP restriction may include a third parameter indicating a transmission time threshold of the transmission time of the uplink data channel corresponding to the uplink grant, and the selection unit 201 may map an uplink grant whose corresponding transmission time of the uplink data channel is earlier than the transmission time threshold indicated by the third parameter with the logical channel. Alternatively or additionally, the LCP restriction may include a fourth parameter indicating that an earliest transmission time of the uplink data channel corresponding to the uplink grant is prioritized, and the selection unit 201 may map an uplink grant with the earliest corresponding transmission time of the uplink data channel for data transmission of a prioritized logical channel based on the fourth parameter with the logical channel.

Alternatively or additionally, the LBT parameter may be related to the random back-off time length. In this embodiment, the LCP restriction may include a fifth parameter indicating a random back-off threshold of the random back-off time length, and the selection unit 201 may map an uplink grant whose random back-off time length is shorter than the random back-off threshold indicated by the fifth parameter with the logical channel. Alternatively or additionally, the LCP restriction may include a sixth parameter indicating that a shortest random back-off time length is prioritized, and the selection unit 201 may map an uplink grant with the shortest random back-off time length for data transmission of a prioritized logical channel based on the sixth parameter with the logical channel.

Alternatively or additionally, in a case that there are a plurality of uplink grants whose corresponding LBT parameters are different, a priority order for the plurality of uplink grants is preconfigured according to the corresponding LBT parameters. The LCP restriction may include the priority order, and the selection unit 201 may map an uplink grant which is prioritized according to the preconfigured priority order for data transmission of the logical channel from the plurality of uplink grants with the logical channel.

Alternatively or additionally, the LBT parameter may be related to the LBT type and/or LBT category, the LCP restriction may include a seventh parameter indicating a list of allowed LBT types or LBT categories for an uplink grant to be used, and the selection unit 201 may map an uplink grant whose associated LBT type or LBT category is within the list indicated by the seventh parameter with the logical channel.

In an exemplary embodiment, the LCP restrictions as previously discussed may be configured by the network node.

In an exemplary embodiment, an LCP value of a logical channel is used for indicating the LCP restriction of the logical channel, and has a correspondence with an LBT parameter. In this embodiment, the selection unit 201 may map the uplink grant with the logical channel according to the LCP value of the logical channel.

In an exemplary embodiment, the LCP restrictions may be transmitted to the UE by at least one of:
dedicated RRC signaling,
common RRC signaling,
MAC CE,
an implicit or explicit indicator using a downlink control channel.

Figure 3:
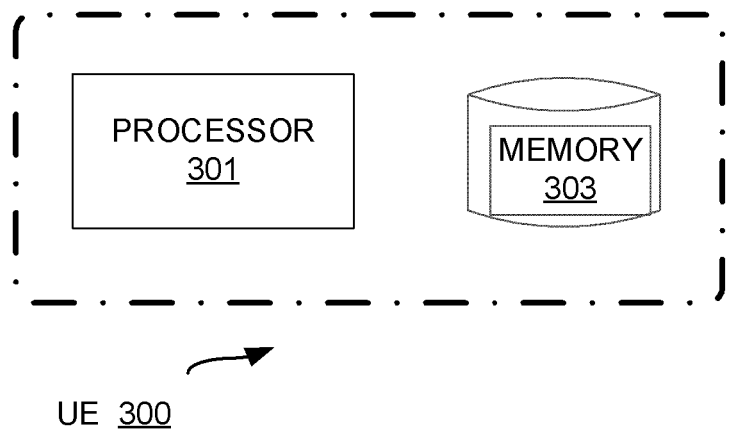
FIG. 3 is a block diagram of a UE according to another exemplary embodiment of the present disclosure.

Hereinafter, a structure of a UE according to another exemplary embodiment of the present disclosure will be described with reference to FIG. 3. FIG. 3 shows a block diagram of a UE 300 according to an exemplary embodiment of the present disclosure. The UE 300 in FIG. 3 may perform the method 100 for data transmission of a logical channel based on LCP as described previously with reference to FIG. 1. Accordingly, some detailed description on the UE 300 may refer to the corresponding description of the method 100 for data transmission of a logical channel based on LCP as previously discussed, and thus will be omitted here for simplicity.

As shown in FIG. 3, the UE 300 may include at least one processor 301 and at least one memory 303. The at least one processor 301 includes e.g., any suitable CPU (Central Processing Unit), microcontroller, DSP (Digital Signal Processor), etc., capable of executing computer program instructions. The at least one memory 303 may be any combination of a RAM (Random Access Memory) and a ROM (Read Only Memory). The at least one processor memory 303 may also comprise persistent storage, which, for example, can be any single one or combination of magnetic memory, optical memory, or solid state memory or even remotely mounted memory.

The at least one memory 303 stores instructions executable by the at least one processor 301, whereby the UE 300 is operative to perform the actions, e.g., of the procedures as described earlier respectively in conjunction with FIG. 1.

In particular, In an exemplary embodiment of causing the UE 300 to perform the actions of the procedure as described earlier respectively in conjunction with FIG. 1, the instructions, when loaded from the at least one memory 303 and executed on the at least one processor 301, may cause the UE 300 to map, in step S101, an uplink grant with a logical channel, according to an LBT parameter associated with the uplink grant, the LBT parameter being related to at least one of a CAPC value, an LBT type, an LBT category, a channel sensing duration, a transmission time of an uplink data channel corresponding to the uplink grant and a random back-off time length.

The instructions, when loaded from the at least one memory 303 and executed on the at least one processor 301, may further cause the UE 300 to perform, in step S103, the data transmission of the logical channel using the uplink grant.

In an exemplary embodiment, the instructions, when executed by the at least one processor 301, cause the UE 300 to map the uplink grant with the logical channel if the LBT parameter associated with the uplink grant meets an LCP restriction of the logical channel.

In an exemplary embodiment, the LBT parameter may be related to the CAPC value, and the LCP restriction may include an allowed CAPC value range for the data transmission of the logical channel. In this embodiment, the instructions, when executed by the at least one processor 301, cause the UE 300 to map the uplink grant whose associated CAPC value is within the allowed CAPC value range with the logical channel.

Alternatively or additionally, the LBT parameter may be related to the channel sensing duration. In this embodiment, the LCP restriction may include a first parameter indicating a channel sensing duration threshold, and the instructions, when executed by the at least one processor 301, cause the UE 300 to map an uplink grant whose channel sensing duration is shorter than the channel sensing duration threshold indicated by the first parameter with the logical channel. Alternatively or additionally, the LCP restriction may include a second parameter indicating that a shortest channel sensing duration is prioritized, and the instructions, when executed by the at least one processor 301, cause the UE 300 to map an uplink grant with the shortest channel sensing duration for data transmission of a prioritized logical channel with the logical channel.

Alternatively or additionally, the LBT parameter may be related to the transmission time of the uplink data channel corresponding to the uplink grant. In this embodiment, the LCP restriction may include a third parameter indicating a transmission time threshold of the transmission time of the uplink data channel corresponding to the uplink grant, and the instructions, when executed by the at least one processor 301, cause the UE 300 to map an uplink grant whose corresponding transmission time of the uplink data channel is earlier than the transmission time threshold indicated by the third parameter with the logical channel. Alternatively or additionally, the LCP restriction may include a fourth parameter indicating that an earliest transmission time of the uplink data channel corresponding to the uplink grant is prioritized, and the instructions, when executed by the at least one processor 301, cause the UE 300 to map an uplink grant with the earliest corresponding transmission time of the uplink data channel for data transmission of a prioritized logical channel based on the fourth parameter with the logical channel.

Alternatively or additionally, the LBT parameter may be related to the random back-off time length. In this embodiment, the LCP restriction may include a fifth parameter indicating a random back-off threshold of the random back-off time length, and the instructions, when executed by the at least one processor 301, cause the UE 300 to map, with a logical channel, an uplink grant whose random back-off time length is shorter than the random back-off threshold indicated by the fifth parameter. Alternatively or additionally, the LCP restriction may include a sixth parameter indicating that a shortest random back-off time length is prioritized, and the instructions, when executed by the at least one processor 301, cause the UE 300 to map, with a prioritized logical channel, an uplink grant with the shortest random back-off time length for data transmission of the prioritized logical channel based on the sixth parameter.

Alternatively or additionally, in a case that there are a plurality of uplink grants whose corresponding LBT parameters are different, a priority order for the plurality of uplink grants is preconfigured according to the corresponding LBT parameters. The LCP restriction may include the priority order, and the instructions, when executed by the at least one processor 301, cause the UE 300 to map an uplink grant which is prioritized according to the preconfigured priority order for data transmission of the logical channel from the plurality of uplink grants.

Alternatively or additionally, the LBT parameter may be related to the LBT type and/or LBT category, the LCP restriction may include a seventh parameter indicating a list of allowed LBT types or LBT categories for an uplink grant to be used, and the instructions, when executed by the at least one processor 301, cause the UE 300 to map an uplink grant whose associated LBT type or LBT category is within the list indicated by the seventh parameter.

In an exemplary embodiment, the LCP restrictions as previously discussed may be configured by the network node.

In an exemplary embodiment, an LCP value of a logical channel is used for indicating the LCP restriction of the logical channel, and has a correspondence with an LBT parameter. In this embodiment, the instructions, when executed by the at least one processor 301, cause the UE 300 to map the uplink grant according to the LCP value of the logical channel.

In an exemplary embodiment, the LCP restrictions may be transmitted to the UE by at least one of:
dedicated RRC signaling,
common RRC signaling,
MAC CE,
an implicit or explicit indicator using a downlink control channel.

Hereinafter, a method at a network node for configuring an LBT parameter at a network node according to an exemplary embodiment of the present disclosure will be described with reference to FIG. 4.

Figure 4:
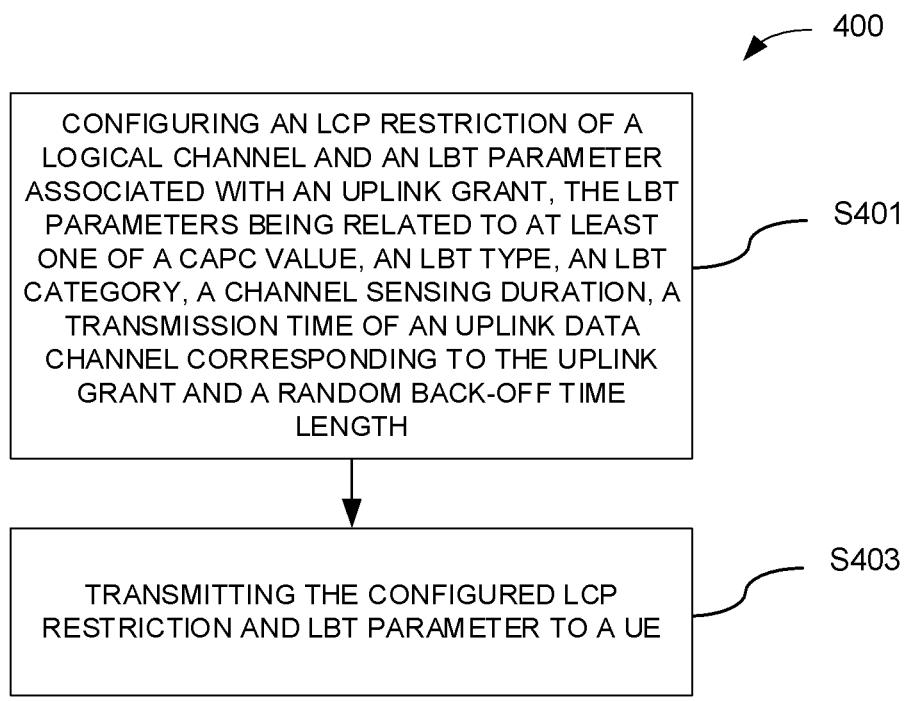
FIG. 4 is a flowchart illustrating a method at a network node for configuring a LBT parameter according to an exemplary embodiment of the present disclosure.

FIG. 4 is a flowchart illustrating a method 400 of configuring an LBT parameter according to an exemplary embodiment of the present disclosure. The method 400 may be performed at a network node.

As shown in FIG. 4, the method 400 may include steps S401 and S403.

In step S401, the network node may configure an LCP restriction of a logical channel and an LBT parameter associated with an uplink grant. The LBT parameter may be related to at least one of a CAPC value, an LBT type, an LBT category, a channel sensing duration, a transmission time of an uplink data channel corresponding to the uplink grant and a random back-off time length.

In step S403, the network node may transmit the configured LCP restriction and LBT parameter to a UE.

In an exemplary embodiment, the LCP restriction and the LBT parameter may be configured per logical channel or per MAC entity.

In an exemplary embodiment, in step S401, the LBT parameter may be configured to be related to the CAPC value, and the LCP restriction may be configured to include an allowed CAPC value range for the data transmission of the logical channel.

Alternatively or additionally, in step S401, the LBT parameter may be configured to be related to the channel sensing duration, and the LCP restriction may be configured to include a first parameter indicating a channel sensing duration threshold and/or a second parameter indicating that a shortest channel sensing duration is prioritized.

Alternatively or additionally, in step S401, the LBT parameter may be configured to be related to the transmission time of the uplink data channel corresponding to the uplink grant, and the LCP restriction may be configured to include a third parameter indicating a transmission time threshold of the transmission time of the uplink data channel corresponding to the uplink grant and/or a fourth parameter indicating that an earliest transmission time of the uplink data channel corresponding to the uplink grant is prioritized.

Alternatively or additionally, in step S401, the LBT parameter may be configured to be related to the random back-off time length, and the LCP restriction may be configured to include a fifth parameter indicating a random back-off threshold of the random back-off time length and/or a sixth parameter indicating that a shortest random back-off time length is prioritized.

In an exemplary embodiment, the method 400 further includes, in a case that a plurality of uplink grants whose corresponding LBT parameters are different are configured for the UE, preconfiguring a priority order for the plurality of uplink grants according to the corresponding LBT parameters. In this embodiment, the LCP restriction may be configured in step S401 to include the priority order.

Alternatively or additionally, in step S401, the LBT parameter may be configured to be related to the LBT type and/or LBT category, and the LCP restriction may be configured to include a seventh parameter indicating a list of allowed LBT types or LBT categories for an uplink grant to be used.

In an exemplary embodiment, an LCP value of a logical channel may be used for indicating the LCP restriction of the logical channel, and may have a correspondence with an LBT parameter.

In an exemplary embodiment, the LCP restrictions may be transmitted in step S403 to the UE by at least one of:
dedicated RRC signaling,
common RRC signaling,
MAC CE,
an implicit or explicit indicator using a downlink control channel.

Figure 5:
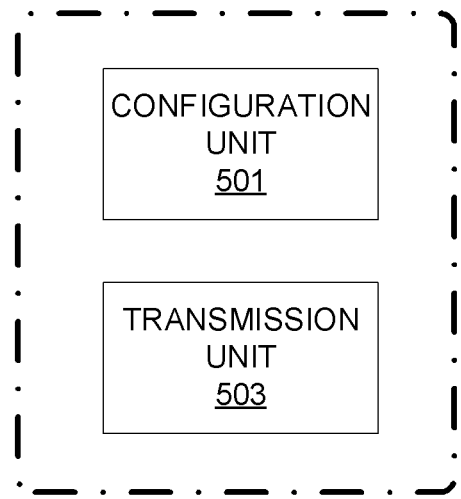
FIG. 5 is a block diagram of a network node according to an exemplary embodiment of the present disclosure.

Hereinafter, a structure of a network node according to an exemplary embodiment of the present disclosure will be described with reference to FIG. 5. FIG. 5 shows a block diagram of a network node 500 according to an exemplary embodiment of the present disclosure. The network node 500 in FIG. 5 may perform the method 400 for of configuring a LBT parameter as described previously with reference to FIG. 4. Accordingly, some detailed description on the network node 500 may refer to the corresponding description of the method 400 for of configuring a LBT parameter as previously discussed, and thus will be omitted here for simplicity.

As shown in FIG. 5, the network node 500 includes a configuration unit 501 and a transmission unit 503.

The configuration unit 501 may configure an LCP restriction of a logical channel and an LBT parameter associated with an uplink grant. The LBT parameter may be related to at least one of a CAPC value, an LBT type, an LBT category, a channel sensing duration, a transmission time of an uplink data channel corresponding to the uplink grant and a random back-off time length.

The transmission unit 503 may transmit the configured LCP restriction and LBT parameter to a UE.

In an exemplary embodiment, the LCP restriction and the LBT parameter may be configured by the configuration unit 501 per logical channel or per MAC entity.

In an exemplary embodiment, the configuration unit 501 may configure the LBT parameter to be related to the CAPC value, and configure the LCP restriction to include an allowed CAPC value range for the data transmission of the logical channel.

Alternatively or additionally, the configuration unit 501 may configure the LBT parameter to be related to the channel sensing duration, and configure the LCP restriction to include a first parameter indicating a channel sensing duration threshold and/or a second parameter indicating that a shortest channel sensing duration is prioritized.

Alternatively or additionally, the configuration unit 501 may configure the LBT parameter to be related to the transmission time of the uplink data channel corresponding to the uplink grant, and configure the LCP restriction to include a third parameter indicating a transmission time threshold of the transmission time of the uplink data channel corresponding to the uplink grant and/or a fourth parameter indicating that an earliest transmission time of the uplink data channel corresponding to the uplink grant is prioritized.

Alternatively or additionally, the configuration unit 501 may configure the LBT parameter to be related to the random back-off time length, and configure the LCP restriction to include a fifth parameter indicating a random back-off threshold of the random back-off time length and/or a sixth parameter indicating that a shortest random back-off time length is prioritized.

In an exemplary embodiment, in a case that a plurality of uplink grants whose corresponding LBT parameters are different are configured for the UE, the configuration unit 501 may preconfigure a priority order for the plurality of uplink grants according to the corresponding LBT parameters. In this embodiment, the configuration unit 501 may configure the LCP restriction to include the priority order.

Alternatively or additionally, the configuration unit 501 may configure the LBT parameter to be related to the LBT type and/or LBT category, and configure the LCP restriction to include a seventh parameter indicating a list of allowed LBT types or LBT categories for an uplink grant to be used.

In an exemplary embodiment, an LCP value of a logical channel may be used for indicating the LCP restriction of the logical channel, and may have a correspondence with an LBT parameter.

In an exemplary embodiment, the LCP restrictions may be transmitted by the transmission unit 503 to the UE by at least one of:
  dedicated RRC signaling,
  common RRC signaling,
  MAC CE,
  an implicit or explicit indicator using a downlink control channel.

Figure 6:
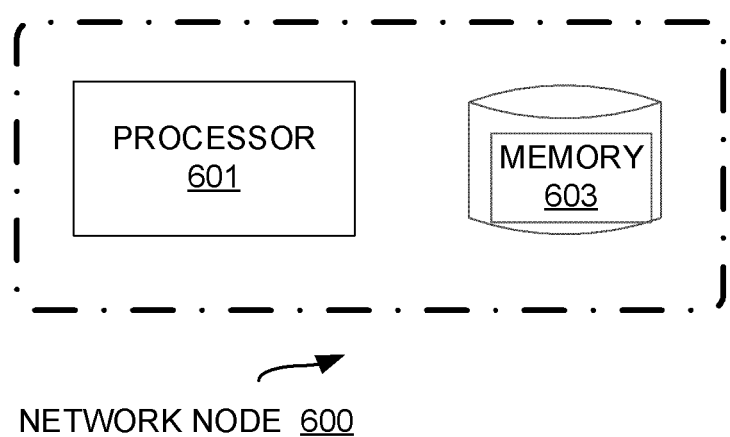
FIG. 6 is a block diagram of a network node according to another exemplary embodiment of the present disclosure.

Hereinafter, a structure of a network node according to an exemplary embodiment of the present disclosure will be described with reference to FIG. 6. FIG. 6 shows a block diagram of a network node 600 according to an exemplary embodiment of the present disclosure. The network node 600 in FIG. 6 may perform the method 400 for configuring a LBT parameter as described previously with reference to FIG. 4. Accordingly, some detailed description on the network node 600 may refer to the corresponding description of the method 400 for configuring a LBT parameter as previously discussed, and thus will be omitted here for simplicity.

As shown in FIG. 6, the network node 600 includes at least one processor 601 and at least one memory 603. The at least one processor 601 includes e.g., any suitable CPU (Central Processing Unit), microcontroller, DSP (Digital Signal Processor), etc., capable of executing computer program instructions. The at least one memory 603 may be any combination of a RAM (Random Access Memory) and a ROM (Read Only Memory). The at least one processor memory 603 may also comprise persistent storage, which, for example, can be any single one or combination of magnetic memory, optical memory, or solid state memory or even remotely mounted memory.

The at least one memory 603 stores instructions executable by the at least one processor 601, whereby the network node 600 is operative to perform the actions, e.g., of the procedures as described earlier respectively in conjunction with FIG. 4.

In particular, In an exemplary embodiment of causing the network node 600 to perform the actions of the procedure as described earlier respectively in conjunction with FIG. 4, the instructions, when loaded from the at least one memory 603 and executed on the at least one processor 601, may cause the network node 600 to configure, in step S401, an LCP restriction of a logical channel and an LBT parameter associated with an uplink grant. The LBT parameter may be related to at least one of a CAPC value, an LBT type, an LBT category, a channel sensing duration, a transmission time of an uplink data channel corresponding to the uplink grant and a random back-off time length.

The instructions, when loaded from the at least one memory 603 and executed on the at least one processor 601, may cause the network node 600 to transmit, in step S403, the configured LCP restriction and LBT parameter to a UE.

In an exemplary embodiment, the instructions, when loaded from the at least one memory 603 and executed on the at least one processor 601, may further cause the network node 600 to configure, in step S401, the LCP restriction and the LBT parameter per logical channel or per MAC entity.

In an exemplary embodiment, the instructions, when loaded from the at least one memory 603 and executed on the at least one processor 601, may further cause the network node 600 to configure, in step S401, the LBT parameter to be related to the CAPC value, and configure the LCP restriction to include an allowed CAPC value range for the data transmission of the logical channel.

Alternatively or additionally, the instructions, when loaded from the at least one memory 603 and executed on the at least one processor 601, may further cause the network node 600 to configure, in step S401, the LBT parameter to be related to the channel sensing duration, and configure the LCP restriction to include a first parameter indicating a channel sensing duration threshold and/or a second parameter indicating that a shortest channel sensing duration is prioritized.

Alternatively or additionally, the instructions, when loaded from the at least one memory 603 and executed on the at least one processor 601, may further cause the network node 600 to configure, in step S401, the LBT parameter to be related to the transmission time of the uplink data channel corresponding to the uplink grant, and configure the LCP restriction to include a third parameter indicating a transmission time threshold of the transmission time of the uplink data channel corresponding to the uplink grant and/or a fourth parameter indicating that an earliest transmission time of the uplink data channel corresponding to the uplink grant is prioritized.

Alternatively or additionally, the instructions, when loaded from the at least one memory 603 and executed on the at least one processor 601, may further cause the network node 600 to configure, in step S401, the LBT parameter to be related to the random back-off time length, and configure the LCP restriction to include a fifth parameter indicating a random back-off threshold of the random back-off time length and/or a sixth parameter indicating that a shortest random back-off time length is prioritized.

In an exemplary embodiment, in a case that a plurality of uplink grants whose corresponding LBT parameters are different are configured for the UE, the instructions, when loaded from the at least one memory 603 and executed on the at least one processor 601, may further cause the network node 600 to preconfigure, in step S401, a priority order for the plurality of uplink grants according to the corresponding LBT parameters. In this embodiment, the instructions, when loaded from the at least one memory 603 and executed on the at least one processor 601, may further cause the network node 600 to configure, in step S401, the LCP restriction to include the priority order.

Alternatively or additionally, the instructions, when loaded from the at least one memory 603 and executed on the at least one processor 601, may further cause the network node 600 to configure, in step S401, the LBT parameter to be related to the LBT type and/or LBT category, and configure the LCP restriction to include a seventh parameter indicating a list of allowed LBT types or LBT categories for an uplink grant to be used.

In an exemplary embodiment, an LCP value of a logical channel may be used for indicating the LCP restriction of the logical channel, and may have a correspondence with an LBT parameter.

In an exemplary embodiment, the instructions, when loaded from the at least one memory 603 and executed on the at least one processor 601, may further cause the network node 600 to transmit, in step S403, the LCP restrictions to the UE by at least one of:
  dedicated RRC signaling,
  common RRC signaling,
  MAC CE,
  an implicit or explicit indicator using a downlink control channel.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the at least one processor 401 causes the UE 400 to perform the actions, e.g., of the procedure described earlier in conjunction with FIG. 1; or code/computer readable instructions, which when executed by the at least one processor 601 causes the network node 600 to perform the actions, e.g., of the procedures described earlier respectively in conjunction with FIG. 4.

The computer program product may be configured as a computer program code structured in computer program modules. The computer program modules could essentially perform the actions of the flow illustrated in FIG. 1 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 7:
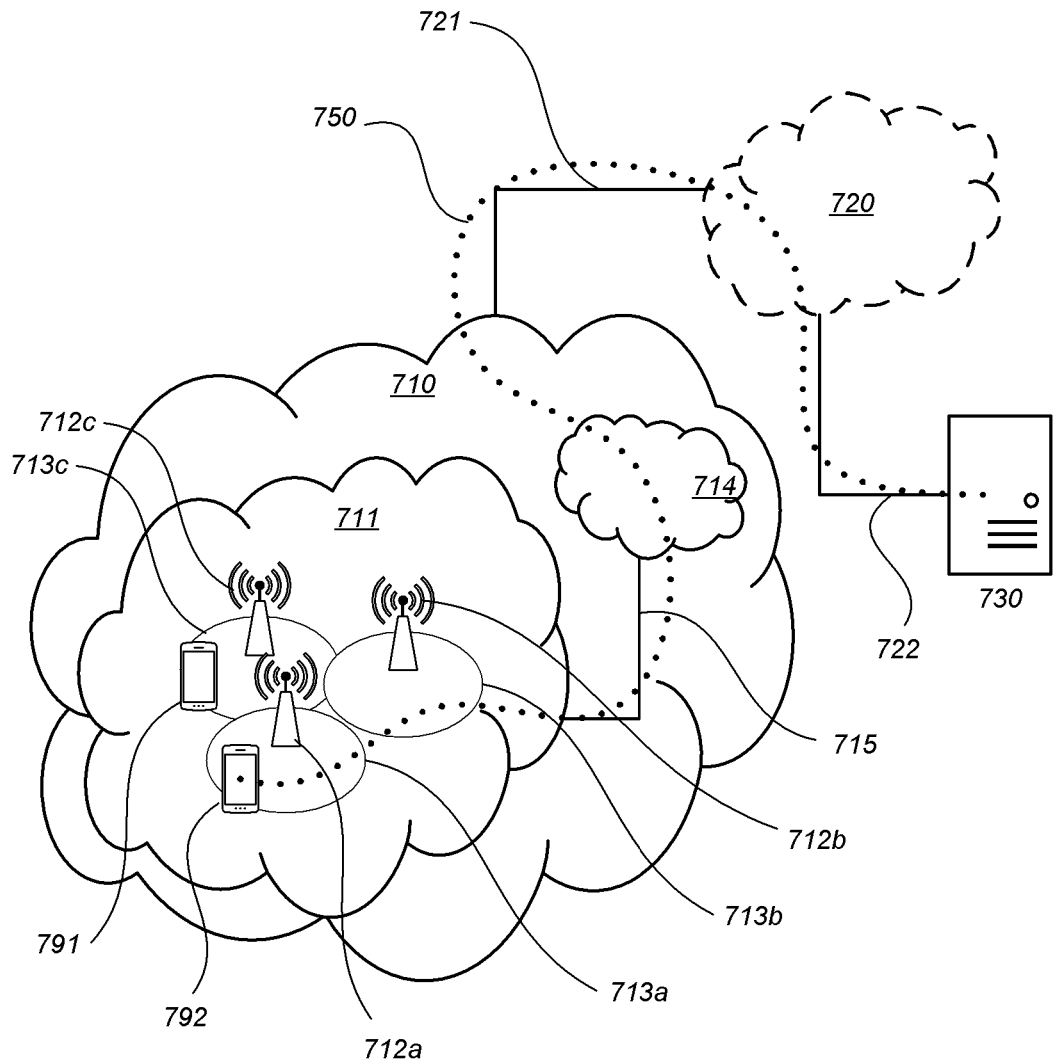
FIG. 7 schematically illustrates a telecommunication network connected via an intermediate network to a host computer.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 88, which is stored in or accessible by the host computer 810 and executable by the processing circuitry 818. The software 88 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
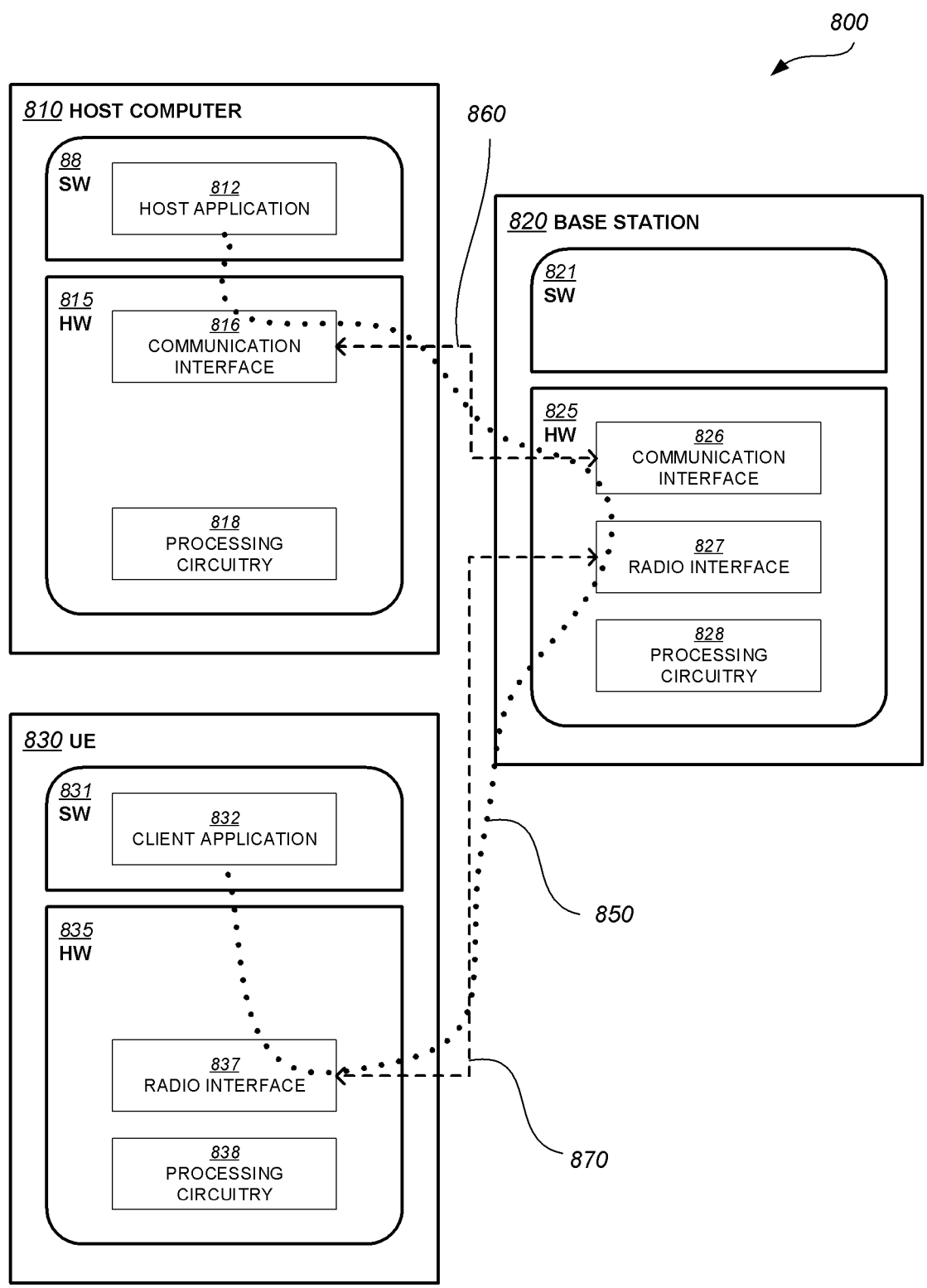
FIG. 8 is a generalized block diagram of a host computer communicating via a base station with a UE over a partially wireless connection.

It is noted that the host computer 810, base station 820 and UE 830 illustrated in FIG. 8 may be identical to the host computer 830, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may reduce PDCCH detection time and complexity and thereby provide benefits such as reduced user waiting time and reduced power consumption at the UE.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 88 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 88, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 88, 831 causes messages to be transmitted, in particular empty or 'dummy' messages, using the OTT connection 850 while it monitors propagation times, errors etc.

Figure 9:
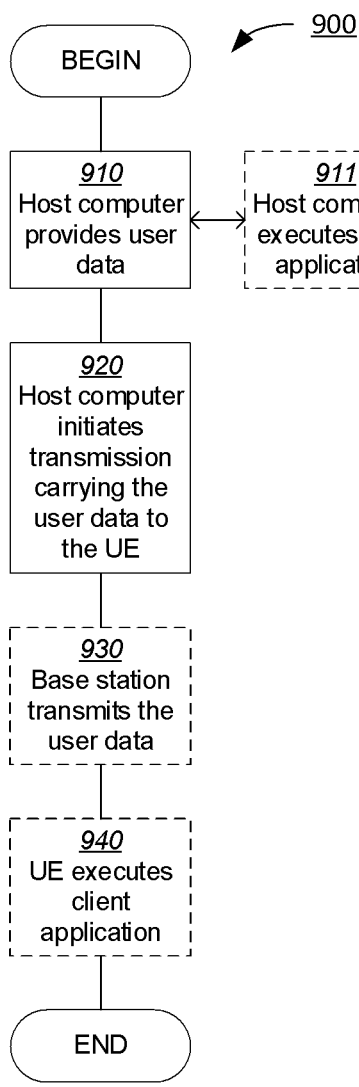

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

Figure 10:
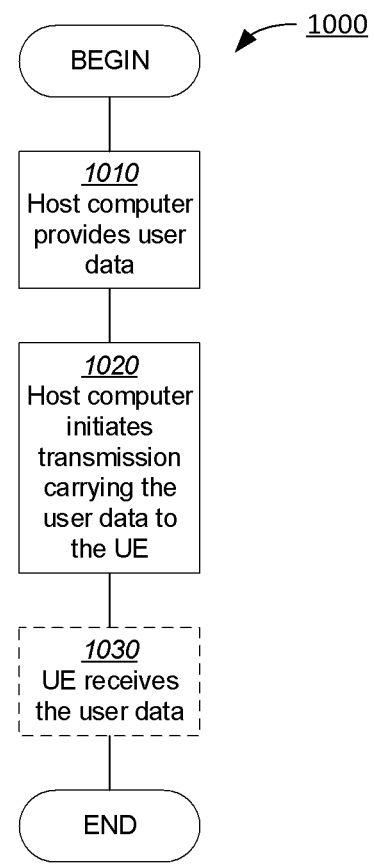

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method at a user equipment (UE), comprising:
mapping an uplink grant with a logical channel, according to a Listen-Before-Talk (LBT) parameter associated with the uplink grant, the LBT parameter being related to an LBT category, the uplink grant being mapped with the logical channel if the LBT parameter associated with the uplink grant meets a Logical Channel Priority (LCP) restriction of the logical channel, the LCP restriction comprising a seventh parameter indicating a list of allowed LBT categories for an uplink grant to be used, and mapping the uplink grant comprising mapping an uplink grant whose associated LBT category is within the list indicated by the seventh parameter with the logical channel; and
performing data transmission of the logical channel using the uplink grant.

2. The method according to claim 1, wherein the LBT parameter is further related to a Channel Access Priority Class (CPAC) value and the LCP restriction comprises an allowed CAPC value range for the data transmission of the logical channel, and
said mapping the uplink grant comprises: mapping an uplink grant whose associated CAPC value is within the allowed CAPC value range with the logical channel.

3. The method according to claim 1, wherein the LBT parameter is further related to a channel sensing duration, and
the LCP restriction comprises a first parameter indicating a channel sensing duration threshold, and said mapping the uplink grant comprises: mapping an uplink grant whose channel sensing duration is shorter than the channel sensing duration threshold indicated by the first parameter with the logical channel; and/or
the LCP restriction comprises a second parameter indicating that a shortest channel sensing duration is prioritized, and said mapping the uplink grant comprises: mapping an uplink grant with the shortest channel sensing duration for data transmission of a prioritized logical channel with the logical channel.

4. The method according to claim 1, wherein the LBT parameter is further related to a transmission time of the uplink data channel corresponding to the uplink grant, and
the LCP restriction comprises a third parameter indicating a transmission time threshold of the transmission time of the uplink data channel corresponding to the uplink grant, and said mapping the uplink grant comprises: mapping an uplink grant whose corresponding transmission time of the uplink data channel is earlier than the transmission time threshold indicated by the third parameter with the logical channel; and/or
the LCP restriction comprises a fourth parameter indicating that an earliest transmission time of the uplink data channel corresponding to the uplink grant is prioritized, and said mapping the uplink grant comprises: mapping an uplink grant with the earliest corresponding transmission time of the uplink data channel for data transmission of a prioritized logical channel based on the fourth parameter with the logical channel.

5. The method according to claim 1, wherein the LBT parameter is further related to a random back-off time length, and
the LCP restriction comprises a fifth parameter indicating a random back-off threshold of the random back-off time length, and said mapping the uplink grant comprises: mapping an uplink grant whose random back-off time length is shorter than the random back-off threshold indicated by the fifth parameter with the logical channel; and/or
the LCP restriction comprises a sixth parameter indicating that a shortest random back-off time length is prioritized, and said mapping the uplink grant comprises:

mapping an uplink grant with the shortest random back-off time length for data transmission of a prioritized logical channel based on the sixth parameter with the logical channel.

6. The method according to claim 1, wherein in a case that there are a plurality of uplink grants whose corresponding LBT parameters are different, a priority order for the plurality of uplink grants is preconfigured according to the corresponding LBT parameters.

7. The method according to claim 6, wherein
the LCP restriction comprises the priority order, and said mapping the uplink grant comprises: mapping an uplink grant which is prioritized according to the preconfigured priority order for data transmission of the logical channel from the plurality of uplink grants with the logical channel.

8. The method according to claim 1, wherein an LCP value of a logical channel is used for indicating the LCP restriction of the logical channel, and has a correspondence with an LBT parameter, and wherein the uplink grant is mapped with the logical channel according to the LCP value of the logical channel.

9. A user equipment (UE), comprising:
at least one processor, and
at least one memory, storing instructions which, when executed on the at least one processor, cause the at least one processor to:
map an uplink grant with a logical channel, according to a Listen-Before-Talk (LBT) parameter associated with the uplink grant, the LBT parameter being related to an LBT category, the uplink grant being mapped with the logical channel if the LBT parameter associated with the uplink grant meets a Logical Channel Priority (LCP) restriction of the logical channel, the LCP restriction comprising a seventh parameter indicating a list of allowed LBT categories for an uplink grant to be used, and mapping the uplink grant comprising mapping an uplink grant whose associated LBT category is within the list indicated by the seventh parameter with the logical channel; and
perform the data transmission of the logical channel using the uplink grant.

10. A method at a network node, comprising:
configuring a Logical Channel Priority (LCP) restriction of a logical channel and a Listen-Before-Talk (LBT) parameter associated with an uplink grant, the LBT parameter being related to an LBT category, the uplink grant being mapped with the logical channel if the LBT parameter associated with the uplink grant meets a Logical Channel Priority (LCP) restriction of the logical channel, the LCP restriction comprising a seventh parameter indicating a list of allowed LBT categories for an uplink grant to be used, and mapping the uplink grant comprising mapping an uplink grant whose associated LBT category is within the list indicated by the seventh parameter with the logical channel; and
transmitting the configured LCP restriction and LBT parameter to a user equipment (UE).

11. The method according to claim 10, wherein the LCP restriction and the LBT parameter are configured per logical channel or per Media Access Control (MAC) entity.

12. The method according to claim 10, wherein the LBT parameter is further related to a Channel Access Priority Class (CPAC) value and the LCP restriction is configured to comprise an allowed CAPC value range for the data transmission of the logical channel.

13. The method according to claim 10, wherein the LBT parameter is further related to a channel sensing duration, and
the LCP restriction is configured to comprise a first parameter indicating a channel sensing duration threshold and/or a second parameter indicating that a shortest channel sensing duration is prioritized.

14. The method according to claim 10, wherein the LBT parameter is further related to a transmission time of the uplink data channel corresponding to the uplink grant, and
the LCP restriction is configured to comprise a third parameter indicating a transmission time threshold of the transmission time of the uplink data channel corresponding to the uplink grant and/or a fourth parameter indicating that an earliest transmission time of the uplink data channel corresponding to the uplink grant is prioritized.

15. The method according to claim 10, wherein the LBT parameter is further related to a random back-off time length, and
the LCP restriction is configured to comprise a fifth parameter indicating a random back-off threshold of the random back-off time length and/or a sixth parameter indicating that a shortest random back-off time length is prioritized.

16. The method according to claim 10, further comprising:
in a case that a plurality of uplink grants whose corresponding LBT parameters are different are configured for the UE, preconfiguring a priority order for the plurality of uplink grants according to the corresponding LBT parameters, and wherein the LCP restriction is configured to comprise the priority order.

17. The method according to claim 10, wherein an LCP value of a logical channel is used for indicating the LCP restriction of the logical channel, and has a correspondence with an LBT parameter.

* * * * *